United States Patent Office 3,445,122
Patented May 20, 1969

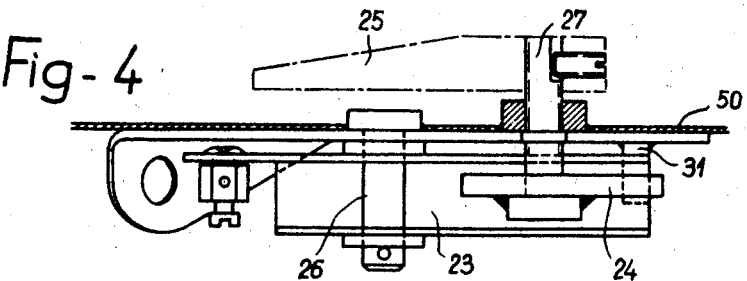
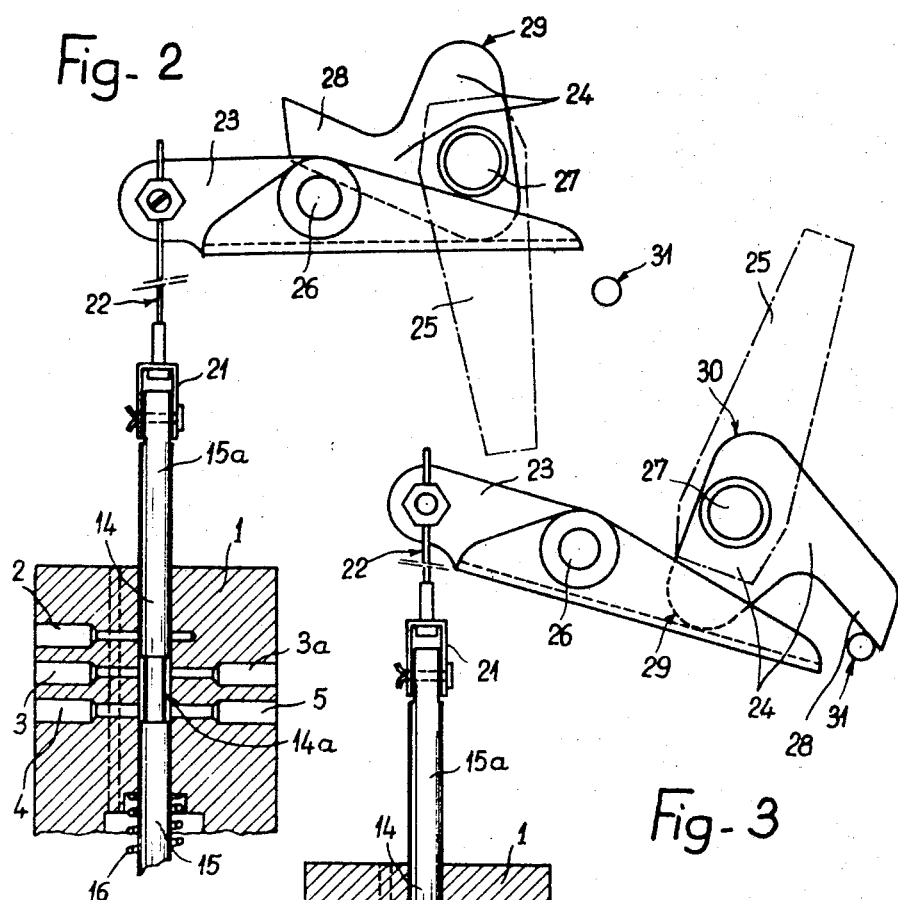
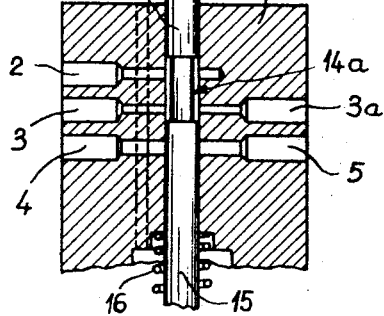

3,445,122
DEVICE FOR THE VERTICAL ADJUSTMENT OF THE BODIES OF AUTOMOTIVE OR OTHER VEHICLES
Jean Georges Cadiou, Paris, France, assignor to Societe Anonyme Andre Citroen, Paris, France, a corporation of France
Filed Feb. 13, 1967, Ser. No. 615,632
Claims priority, application France, Feb. 18, 1966, 50,267
Int. Cl. B60g 17/00, 21/06; B62d 37/00
U.S. Cl. 280—6                                   4 Claims

ABSTRACT OF THE DISCLOSURE

Device for an automotive or other vehicle having a suspension system equipped with vertical correctors and supplied with fluid under pressure through a distributor, which comprises a lever actuated by a cam, both mounted pivotally on pins secured to the body of the vehicle. The lever controls by means of a mechanical connecting member the sliding member of an adjustment valve which is adapted to connect in one position the return port of the vertical correctors to a fluid reservoir, and in two other positions to connect the suspension system directly to the pressure-fluid distributor or to connect the return ports of said system and said correctors to said fluid reservoir.

It is already known to actuate level correcting devices inserted in the suspension system of automotive or other vehicles with a view to modify the height of the body, or ground clearance, of the vehicle. However, the adaptation of a control member on devices of this character may be attended by various difficulties, notably when it is contemplated to adapt such devices to a vehicle of predetermined design.

It is the object of the present invention to facilitate this adaptation to permit the modification of the ground clearance of the vehicle body without acting upon the correcting devices proper.

It is the essential object of this invention to provide an adjustment valve intended for automotive and other vehicles of which the suspension system, equipped with vertical correcting means, is fed with fluid under pressure through a distributor; this valve is essentially characterised in that it comprises a slide valve member adapted in its normal position to isolate the suspension system and to cause the return ports of the vertical correcting means to communicate with a fluid reservoir; said slide member, when in its upper position, causing the suspension system of the vehicle to communicate directly with the pressure-fluid distributor and, in its lower portion, connecting the suspension system and the return ports of said correcting means with the fluid reservoir.

The first position of the slide member corresponds to the normal driving conditions of the vehicle, in which the pressure prevailing in the suspension system is subordinate to the normal operation of the ground-clearance correcting means, the vehicle having its maximum or minimum ground clearance, according as the slide member is in its upper or lower position, respectively.

In order to afford a clearer understanding of this invention and of the manner in which the same may be carried out in practice, reference will now be made to the accompanying drawings illustrating diagrammatically by way of example a typical form of embodiment thereof, and in which:

FIGURES 2 and 3 are views similar to FIGURE 1 wherein the slide member is its lower or upper positions, respectively, and FIGURE 4 is a fragmentary view as seen in the direction of the arrow IV of one portion of the device of FIGURE 1.

Figure 1:
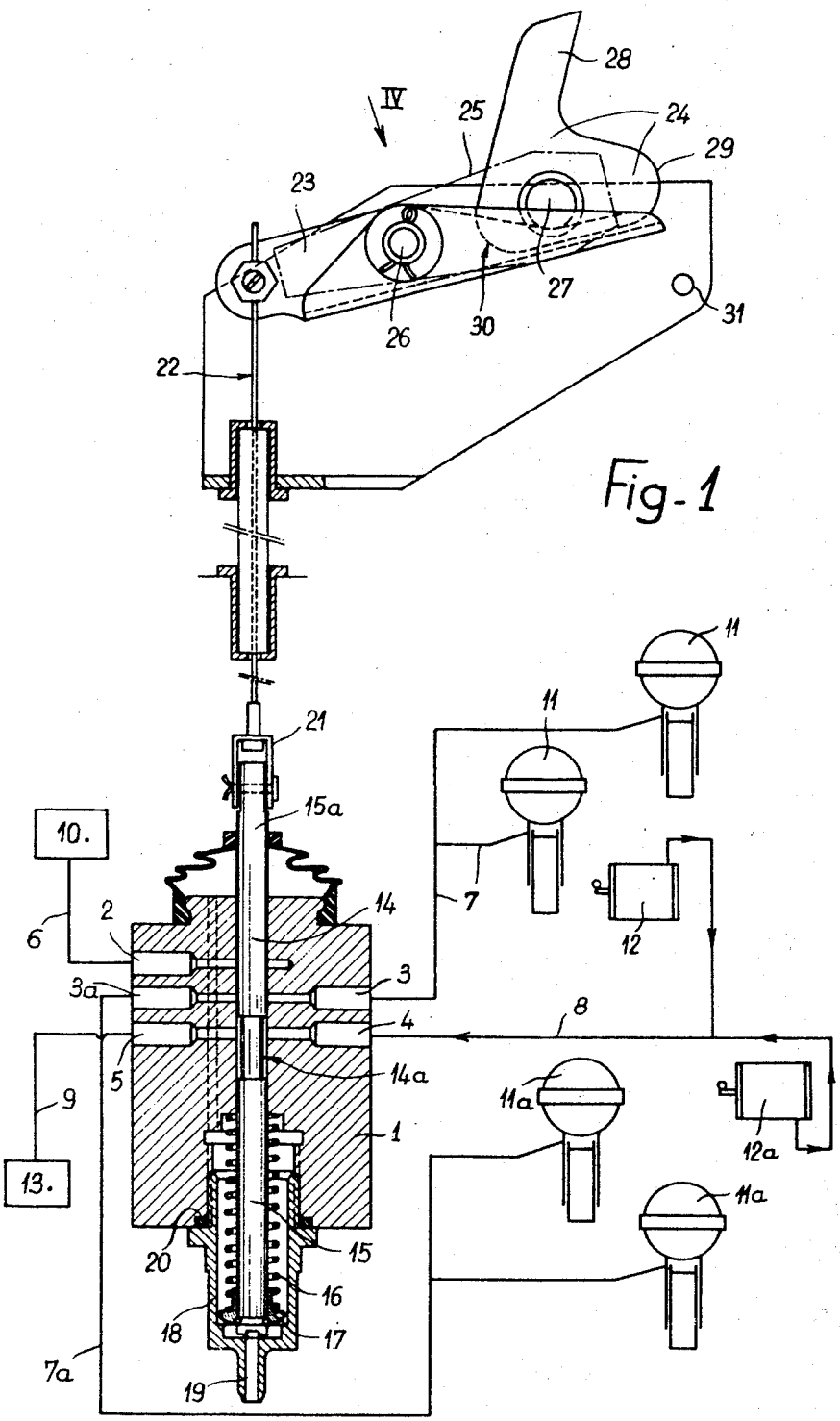
FIGURE 1 is a part-sectional, diagrammatical view of this specific form of embodiment of the device, the slide valve member being shown in its normal driving position.

Referring to the drawings, it will be seen that the valve according to this invention consists of a cylinder 1 having lateral ports 2, 3 and 3a, 4 and 5 connected respectively by means of pipe lines 6, 7 and 7a, 8 and 9 to a pressure-fluid distributor 10, to the front and rear sections 11 and 11a of the suspension system of an automotive vehicle, to return ports of vertical correcting devices 12 and 12a of a type already known per se, which are associated with the front and rear sections of the suspension system of the vehicle, and finally to a fluid reservoir 13.

Slidably mounted in the cylinder 1 is a slide valve member 14 comprising an intermediate section 14a of reduced diameter and end sections 15 and 15a projecting from the cylinder. The slide valve member 14 is constantly urged downwards by a spring 16 reacting against an internal shoulder of cylinder 1, and also against a cup 17 secured to the end 15 of this slide member, and adapted to engage in its lowermost position the inner face of a cap 18. This cap 18 secured to the cylinder 1 is provided with a drain pipe 19 receiving the valve leakage fluid, the joint between the cylinder 1 and cap 18 being sealed by a gasket 20.

Pivotally mounted to the end 15a of the piston-forming slide member 14 is a strap 21 connected for example through linkage means or a sheathed cable 22 as shown in the drawing to a lever 23 adapted to be actuated manually by means of a cam 24 solid with handle 25. The lever 23 and cam 24 are pivotally mounted within the body 50 of the vehicle (see FIGURE 4) about pivot pins 26 and 27, this cam 24 comprising an arm 28 and rounded portions 29 and 30 disposed at an unequal distance from the axis of pivot pin 27. The aforesaid pivot pin 26 and a stop pin 31 secured to the body of the vehicle permit of limiting the amplitude of the angular movements of said arm 28.

It may be noted that when the handle 25 is in its lower position (as shown in FIGURE 2) the arm 28 and the rounded portion 30 of cam 24 which is nearest to the pivot pin 27 contact respectively the pivot pin 26 and lever 23. Thus, the slide valve member 14 closes the port 2 and opens the ports 3 and 3a, 4 and 5 with its portion 14a of reduced diameter.

If the handle 25 is in its upper position (FIGURE 3) the arm 28 and the rounded portion 29 engage respectively the stop 31 and lever 23. Thus, the slide valve member 14 closes the ports 4 and 5 and permit the communication between the ports 3 and 3a, on the one hand, and port 2, on the other hand.

When the handle 25 is in its intermediate position (FIGURE 1) the portions 29 and 30 of cam 24 engage the lever 23 and only the ports 4 and 5 are uncovered.

As a result, the mean position of the control handle corresponds to the normal driving condition of the vehicle, wherein the pressure prevailing in the suspension members 11 and 11a depends on the normal operation of the level correcting devices 12 and 12a, this handle permitting when moved to its upper position, the direct supply of fluid under pressure to the suspension members, the return lines 8 of the corrector devices being simultaneously closed, and of giving to the vehicle its maximum ground clearance as permitted by the rebound check stops.

As contrasted thereto, the suspension members 11 and 11a are connected to the exhaust if the control handle is in its lower position. Thus, these members are indirectly exhausted or drained the vehicle body is lowered to the minimum height permitted by the rebound check stops.

Finally, it will be noted that the pivot pin 26 and stop 31 limiting the amplitude of the angular movements of the arm 28 are so disposed that the cam 24, during its engagement with either of these members, has already over-stepped its positions of maximum action. Thus, the manual valve control device of this invention is made non-reversible.

Of course, the specific form of embodiment illustrated and described herein should not be construed as limiting the scope of this invention, since many modifications may be brought thereto without departing from the spirit and scope of the invention as set forth in the appended claims.

I claim:

1. A device for the vertical adjustment of the body of an automotive or other vehicle comprising in combination a suspension system having return ports controlled by a fluid under pressure, vertical correcting means having return ports associated with said suspension system, a pressure-fluid distributor, a fluid reservoir connected to said return ports of said suspension system and said correcting means, a fluid valve for interconnecting predetermined ports of said return ports, a sliding member in said valve for connecting selectively said distributor, reservoir, suspension system and correcting means, a lever, a cam having two end positions and an intermediate position for actuating said lever, means connecting said lever to said sliding member whereby the return ports of said vertical correcting means may be selectively connected to said fluid reservoir when said cam is in said intermediate position for a normal automatical control of the suspension system level, or said distributor may be connected directly to said suspension system or said reservoir may be connected directly to the return ports of said suspension system and said correction means when said cam is in its two end positions to bring said vehicle body directly to its highest or lowest position.

2. Device according to claim 1, wherein pins are secured to said body of the vehicle and said lever and said cam are pivotally mounted on said pins.

3. Device according to claim 2, wherein said cam has two rounded portions located at unequal distances from the cam pivot pin which by engaging said lever determine the position of said valve corresponding to said normal control of said suspension system, or to its direct highest and lowest position control and two stops are secured to the vehicle body limiting the amplitude of the angular movements of said cam.

4. Device according to claim 2 wherein a manually actuated handle is provided to which said cam is fixed.

References Cited

UNITED STATES PATENTS

| 2,954,237 | 9/1960 | Sampietro. |
| 2,989,322 | 6/1961 | Hrebicek. |
| 3,103,368 | 9/1963 | Erickson _____ 280—6 |

PHILIP GOODMAN, *Primary Examiner.*

U.S. Cl. X.R.

280—124